US012692143B2

(12) United States Patent
Benedict

(10) Patent No.: US 12,692,143 B2
(45) Date of Patent: Jul. 28, 2026

(54) DRAIN FUNNEL ADAPTER

(71) Applicant: OHNOH20, LLC, Lake Worth, FL (US)

(72) Inventor: Brian Benedict, Lake Worth, FL (US)

(73) Assignee: OHNOH20, LLC, Lake Worth, FL (US)

( * ) Notice: Subject to any disclaimer, the term of this patent is extended or adjusted under 35 U.S.C. 154(b) by 0 days.

(21) Appl. No.: 18/437,499

(22) Filed: Feb. 9, 2024

(65) Prior Publication Data

US 2024/0270559 A1 Aug. 15, 2024

Related U.S. Application Data

(60) Provisional application No. 63/484,287, filed on Feb. 10, 2023.

(51) Int. Cl.
*B67C 11/02* (2006.01)

(52) U.S. Cl.
CPC .................................... *B67C 11/02* (2013.01)

(58) Field of Classification Search
CPC .......................... B67C 11/02; B67C 2011/025
USPC .................................................. 141/343, 332
See application file for complete search history.

(56) References Cited

U.S. PATENT DOCUMENTS

| | | | | | |
|---|---|---|---|---|---|
| 2,987,080 | A * | 6/1961 | Chandler | B25B 27/0042 | 251/351 |
| 4,867,017 | A * | 9/1989 | Holman | B25B 27/0042 | 81/120 |
| 5,259,426 | A * | 11/1993 | Burleigh | B25B 27/0042 | 141/331 |
| 5,479,970 | A * | 1/1996 | Trani | B67C 11/02 | 222/481.5 |
| 10,729,996 | B2 | 8/2020 | Rodriguez et al. | | |
| 2003/0155181 | A1 | 8/2003 | Reinke | | |
| 2013/0146174 | A1* | 6/2013 | Zinn | B65B 3/045 | 141/2 |
| 2015/0115184 | A1 | 4/2015 | Allott et al. | | |

FOREIGN PATENT DOCUMENTS

| | | |
|---|---|---|
| DE | 102010046528 | 3/2012 |

* cited by examiner

*Primary Examiner* — Timothy P. Kelly
(74) *Attorney, Agent, or Firm* — McHale & Stavin, P.A.

(57) ABSTRACT

Devices and methods for transferring fluids from one container to another. A drain funnel adapter for facilitating the transfer of a fluid from one container to another using a funnel, the drain funnel adapter having a first end constructed and arranged to secure to a first container having a fluid, and a second end constructed and arranged to secure to a second container for storing a fluid transferred through the drain funnel adapter from the first container.

14 Claims, 12 Drawing Sheets

DRAIN FUNNEL ADAPTER

CROSS REFERENCE

In accordance with 37 C.F.R. 1.76, a claim of priority is included in an Application Data Sheet filed concurrently herewith. Accordingly, the present invention claims priority to U.S. Provisional Patent Application No. 63/484,287, entitled "DRAIN FUNNEL ADAPTER", filed on Feb. 10, 2023. The contents of the above referenced application are incorporated herein by reference in their entirety.

FIELD OF THE INVENTION

Embodiments of the present invention relate to the transferring of fluids from one container to another; and more particularly, to a drain funnel adapter for facilitating the transfer of a fluid from one container secured at a first end of a drain funnel adapter body, to a second, independent container secured at a second end of the drain funnel adapter body.

BACKGROUND OF THE INVENTION

Impurities and/or water mixed with gasoline can be problematic for motor driven devices, such as boats. Water in boat engines prevents the boat from operating properly. Engine failure in open waters leaves the boat unable to safely navigate. This can result in a very dangerous situation, as the boat may only be capable of drifting through the water. Fuel/water separators are found on many boats to prevent engine failure due to water and/or impurities. Such separators are designed to deliver clean fuel, i.e. no water, to the engine. Some fuel filter water separators use a fluid collecting canister to collect filtered off water. Once separated, the water must be drained from the fluid collecting canister. Usually, tubing connected to the fluid collecting canister aids in this process. While simple and cheap, use of tubing can be messy. Improved devices, which are simple and easy to use, preventing water leakage during the draining process are needed.

SUMMARY OF THE INVENTION

Embodiments of the present invention relate to an adapter for facilitating the transfer of a fluid from one container to another using a funnel.

Accordingly, it is an objective of the invention to provide a device for facilitating the transfer of a fluid from one container to another.

It is a further objective of the invention to provide a drain funnel adapter for facilitating the transfer of a fluid from one container to a second container.

It is yet another objective of the invention to provide a drain funnel adapter for facilitating the transfer of a fluid from one container to another, wherein the drain funnel adapter engages with and/or secures to a fuel filter water separator.

It is a still further objective of the invention to provide a drain funnel adapter for facilitating the transfer of a fluid from one container to another, wherein the drain funnel adapter engages with and/or secures to a fluid collecting unit.

It is a further objective of the invention to provide a drain funnel adapter for facilitating the transfer of a fluid from one container to another, wherein the drain funnel adapter engages with and/or secures to a fuel filter water separator at one end, and to a fluid collecting unit at a second end.

It is yet another objective of the invention to provide a drain funnel adapter for facilitating the transfer of a fluid from one container to another, wherein the drain funnel adapter is keyed to engage with and secure to a corresponding, conjugately shaped portion of a fuel filter water separator.

It is a still further objective of the invention to provide a drain funnel adapter for facilitating the transfer of a fluid from one container to another, wherein the drain funnel adapter is constructed and arranged to direct fluid into an attached fluid collecting unit.

Other objectives and advantages of the invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

DETAILED DESCRIPTION OF THE INVENTION

Figure 1:
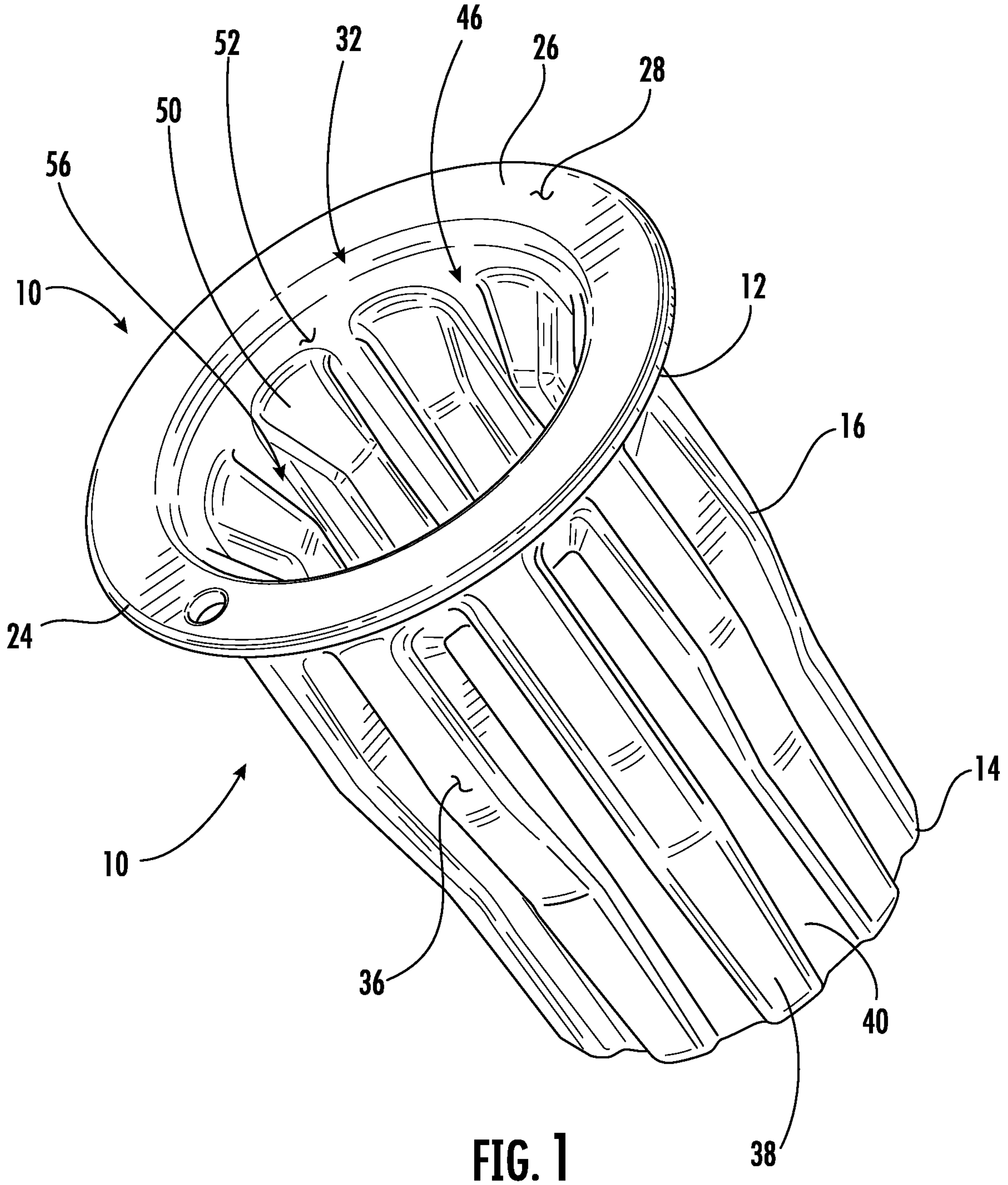
FIG. 1 is a top perspective view of an embodiment of a drain funnel adapter.

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

An adapter for facilitating the transfer of a fluid from one container to another using a funnel. As illustrated in FIGS. 1-7, an embodiment of a drain funnel adapter, referred to generally as a drain funnel adapter 10, is shown. While the drain funnel adapter 10 is illustrated in use for draining water from a fuel filter water separator used in the marine industry, such use is illustrative only. The drain funnel adapter 10 includes a first end 12, a second, opposing end 14, and a main body 16 separating the first end 12 and the second end 14. The main body 16 includes tapering 18, thus defining an upper end or portion 20, see FIG. 4, and a lower end or portion 22. The upper end or portion 20 has a larger diameter, $D_1$, than the diameter, $D_2$, of the lower end or portion 22.

Figure 2:
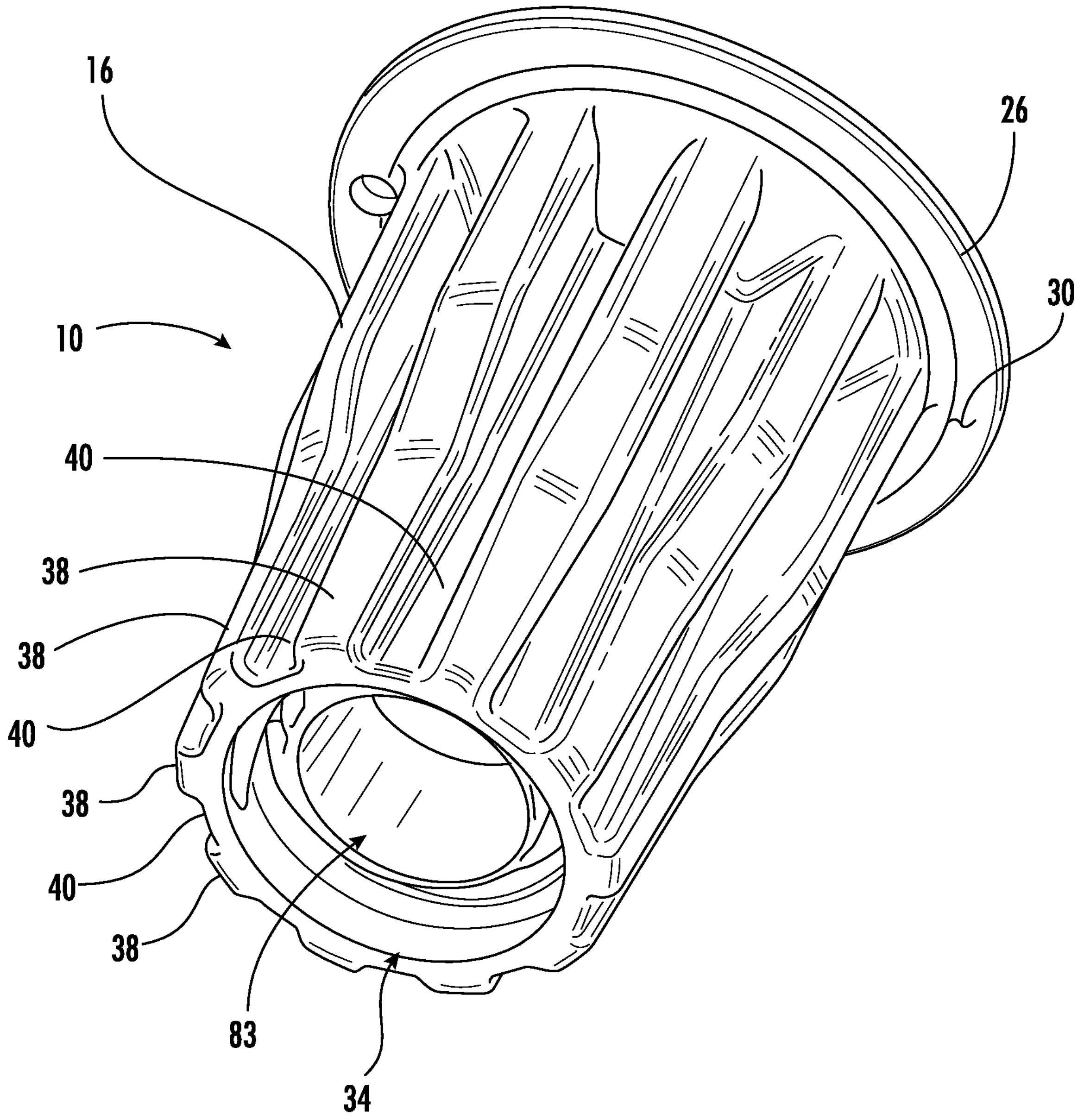
FIG. 2 is a bottom perspective view of the drain funnel adapter.

The drain funnel adapter main body 16 includes a flanged portion 24 integrally formed or attached to the drain funnel adapter first end 12. The flanged portion 24 is illustrated as a wall 26 having a first, outer surface 28 and a second, inner surface 30. The wall 26 extends out from the main body 16 and around the main body 16 perimeter. A first opening, referred to as a first end opening 32, is sized, shaped, and arranged to allow the drain funnel adapter 10 to secure to a first container. A second opening, referred to as a second end opening 34, see FIG. 2, is sized, shaped, and arranged to allow the drain funnel adapter 10 to secure to a second container. An outer surface 36 of the drain funnel adapter main body 16 includes one or more surface protrusions 38. The one or more surface protrusions 38 may be sized to span the length of the funnel adapter main body 16, extending from the first end 12 to the second end 14. If including multiple surface protrusions 38, the multiple surface protrusions 38 are positioned around the perimeter of the main body 16, spaced apart by channels 40, thus forming an outer surface 36 defined by a pattern of alternating surface protrusions 38 and channels 40.

Figure 10:
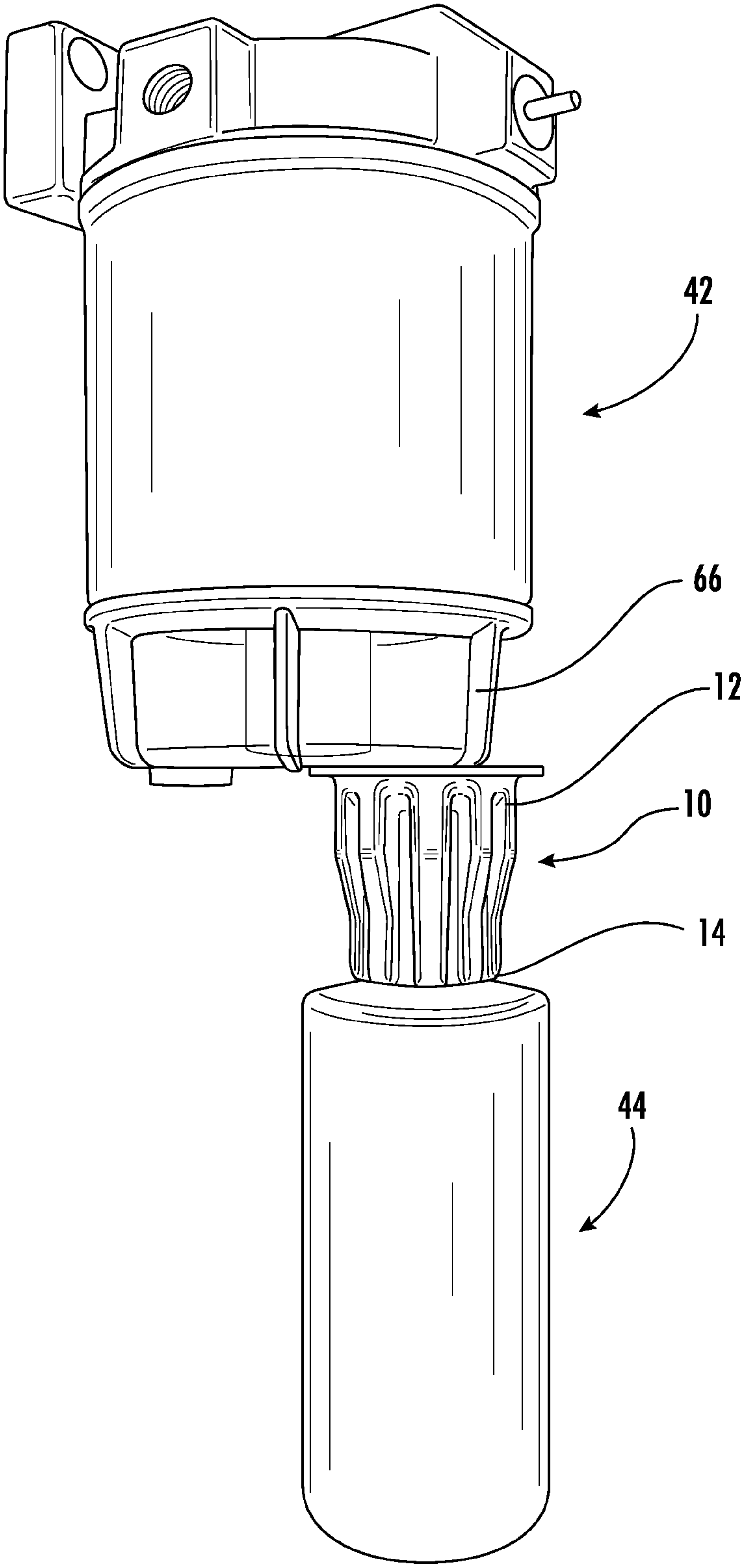
FIG. 10 illustrates the drain funnel adapter secured to a first container, illustrated as a fuel filter water separator, with a water separator collection bowl, and to a second container, illustrated as a small bottle.

The drain funnel adapter 10 is designed to secure a first container at the first end 12, a second container at the second end 14, and allow for fluid to pass through the interior, from the first end 12 towards the second end 14. In an illustrative use, the drain funnel adapter 10 may be used for draining water that has collected in a fuel filter water separator collection bowl. Accordingly, the drain funnel adapter 10 is constructed and arranged to fit or engage with and secure to a fuel filter water separator 42 at the first end 12 and to a fluid container 44 at the second end 14, see FIG. 10. An interior 46 of the drain funnel adapter 10 is designed to aid in securing the drain funnel adapter 10 to the fuel filter water separator 42 and to the fluid container 44 while allowing fluid to pass therein.

Figure 3:
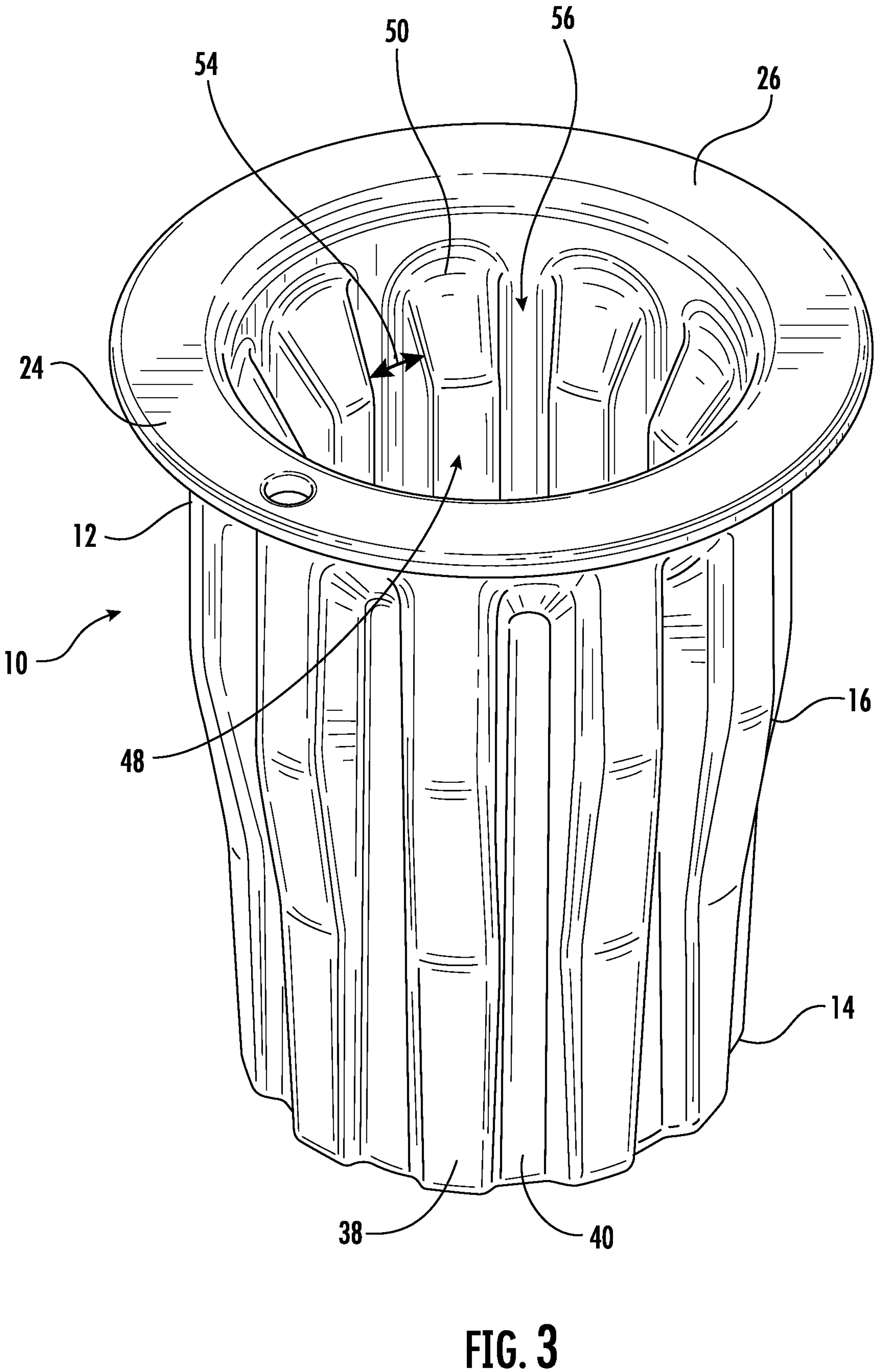
FIG. 3 is an alternative perspective view of the drain funnel adapter.
Figure 4:
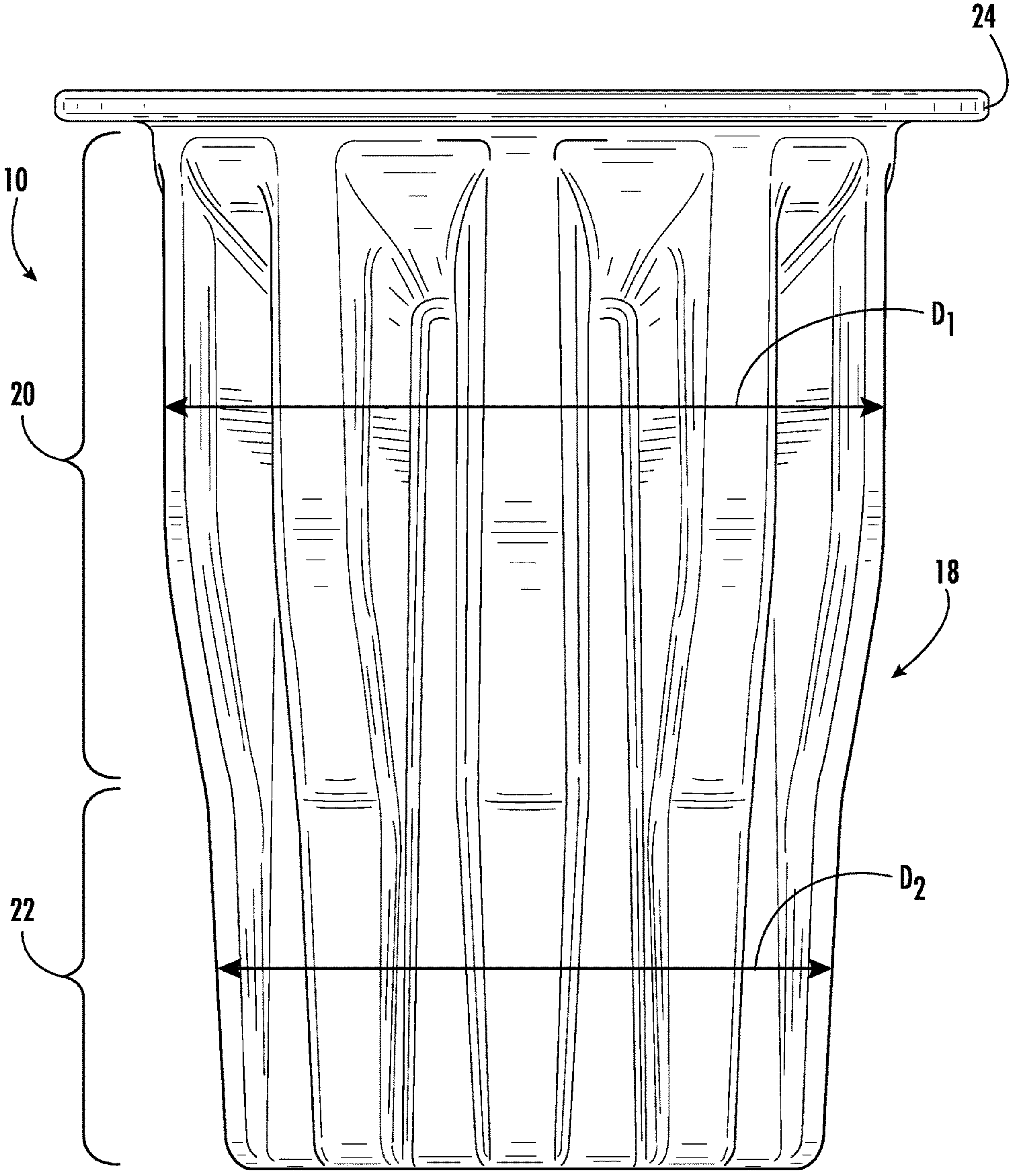
FIG. 4 is a side view of the drain funnel adapter.
Figure 5:
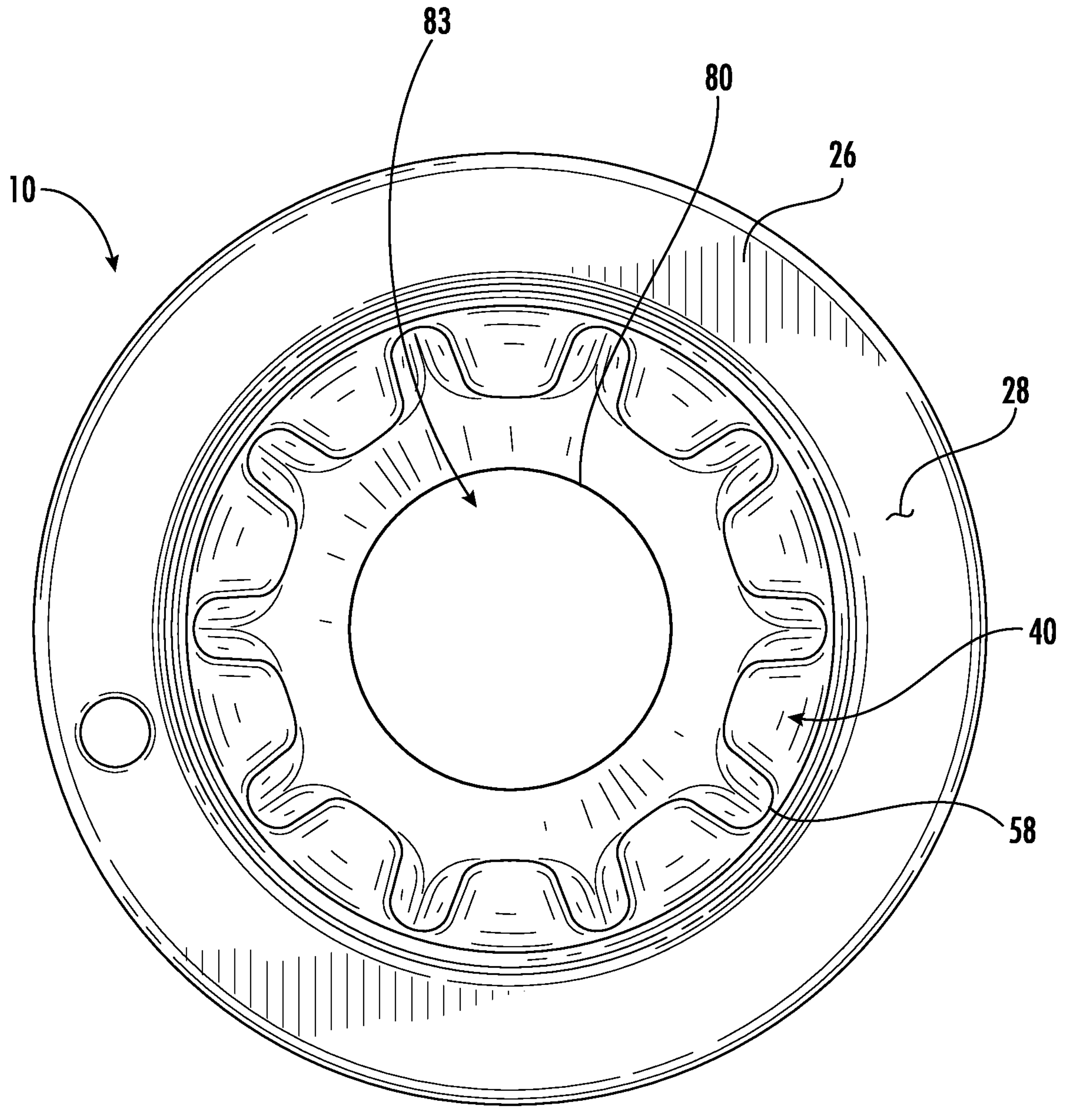
FIG. 5 is a top view of the drain funnel adapter.
Figure 6:
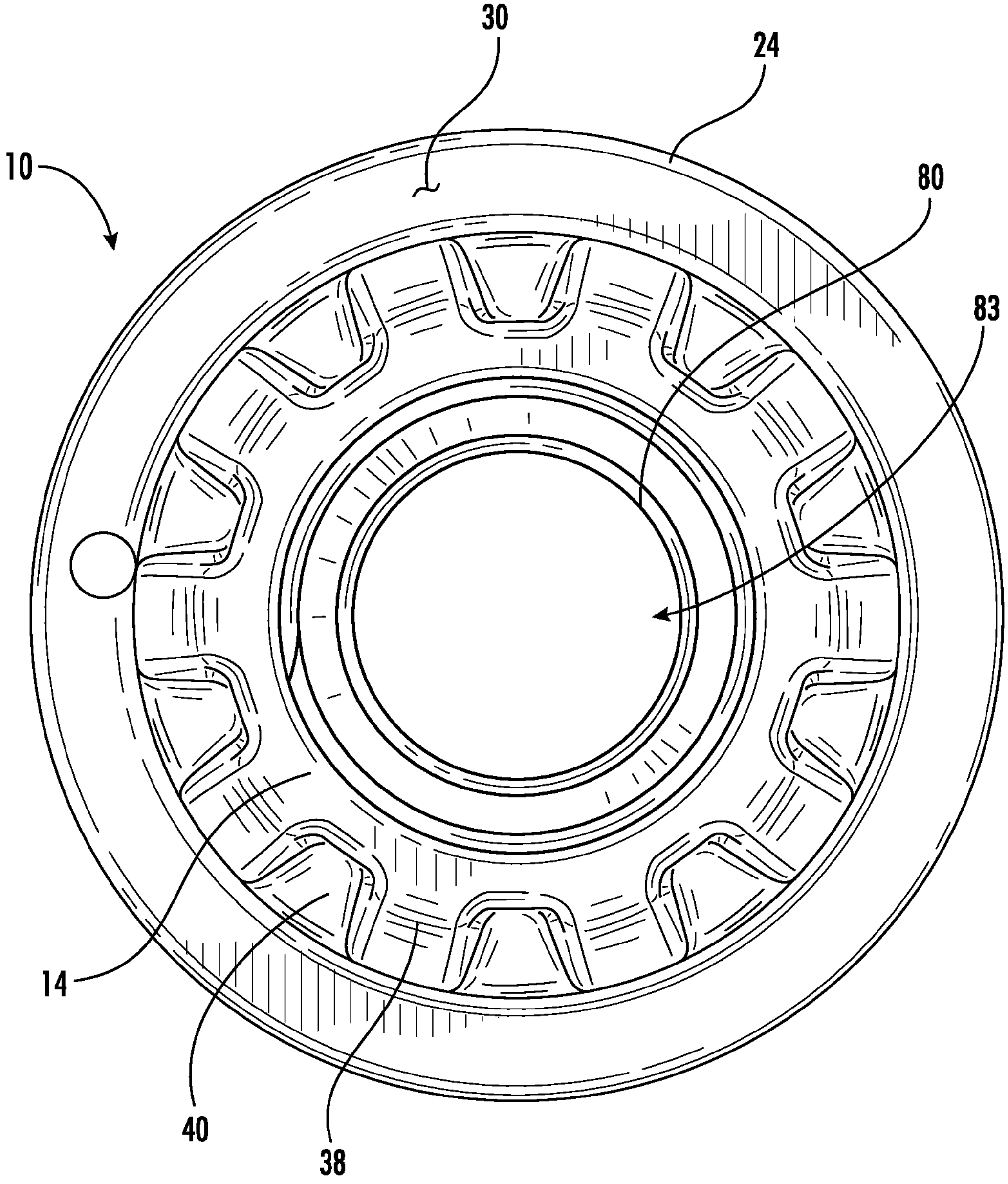
FIG. 6 is a bottom view of the drain funnel adapter.

The drain funnel adapter interior 46 comprises a first end locking unit 48 (may also be referred to as a first locking or engagement member), see FIG. 3, constructed and arranged to engage with or secure to a portion of the fuel filter water separator 42. The first end locking unit 48 may comprise a plurality of engaging members 50, illustrated herein as protuberances or elongated bodies extending out from an interior surface 52, towards the middle of the drain funnel adapter 10. The plurality of engaging members 50 may be arranged around the perimeter of the inner surface 52, and separated from adjacent engaging members 50 (to the left or the right) by a space 54, thus forming fluid flow channels 56. Accordingly, the interior 46 may include a repeat, alternating pattern of an engaging member 50 followed by a fluid flow channel 56. The engaging members 50 are each shown having a top wall or surface 58, two opposing side walls or surfaces, a first side wall or surface 60 and a second side wall or surface 62, and a front wall or surface 64. The distance between the first side wall or surface 60 of a first engaging member 50 and the second side wall of an adjacent second engaging member 50 defines the fluid flow channel 56.

The embodiment illustrated in FIGS. 1-10 shows the plurality of engaging members 50 arranged about the inner perimeter to be keyed to fit with a ten-sided, or decagon shaped, corresponding object or surface. Accordingly, the drain funnel adapter 10 includes ten (10) engaging members 50 constructed and arranged within the drain funnel adapter interior 46 to engage with or secure to a corresponding or conjugately shaped object. Referring to FIG. 9A, the fuel filter water separator 42 is illustrated with a fuel filter water separator collection bowl 66 attached. The fuel filter water separator collection bowl 66 includes a drainage port 68 with a self-venting water drain 70 secured within. The self-venting water drain 70 includes a screw head 72 and hose 74 attached. The screw head 72 comprises ten (10) side walls or surfaces 76, (see FIG. 9B, illustrating nine (9) of the ten (10) outer surfaces) forming a decagon shaped outer perimeter surface.

Figure 7A:
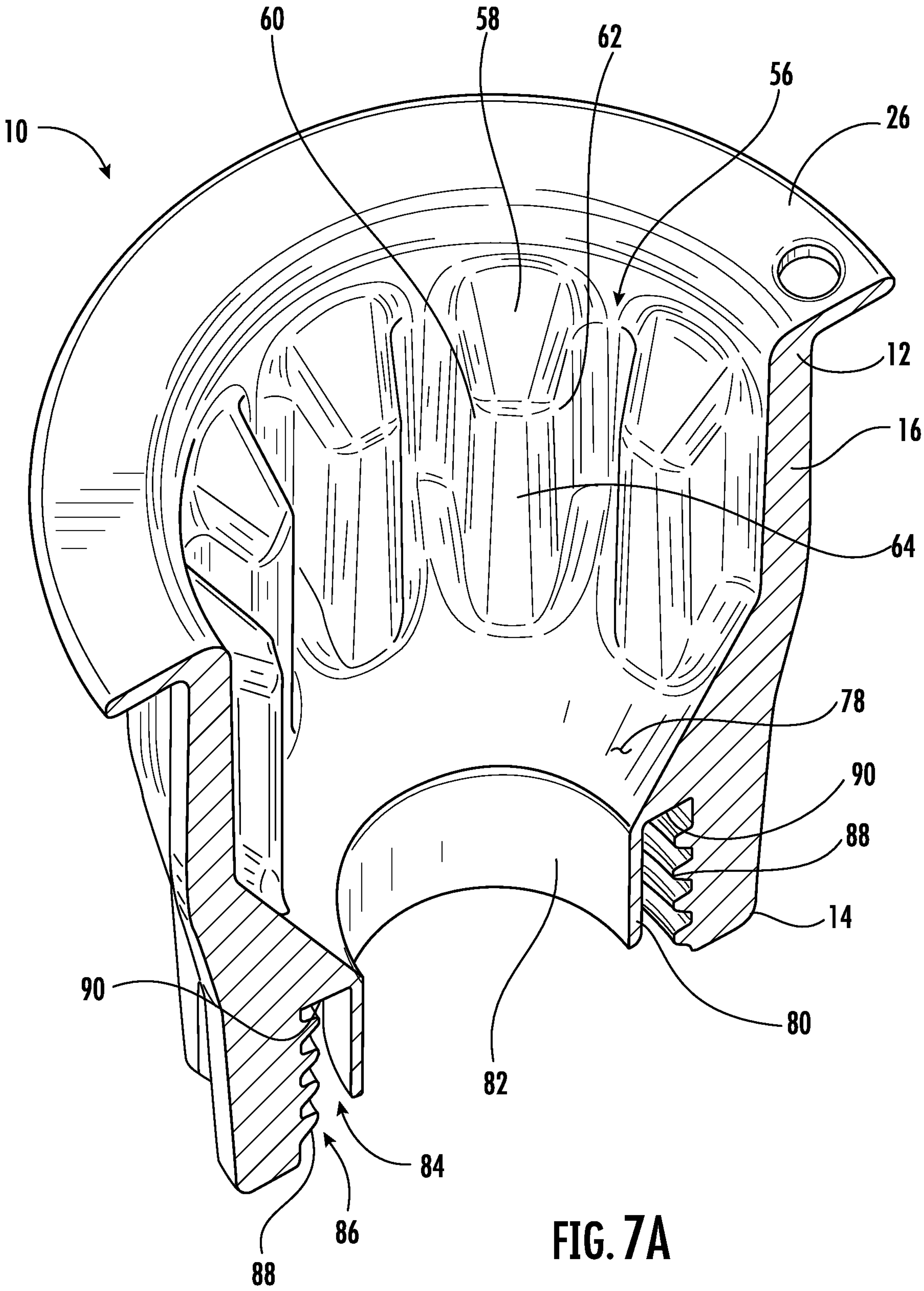
FIG. 7A is a cross-sectional view of the drain funnel adapter.
Figure 7B:
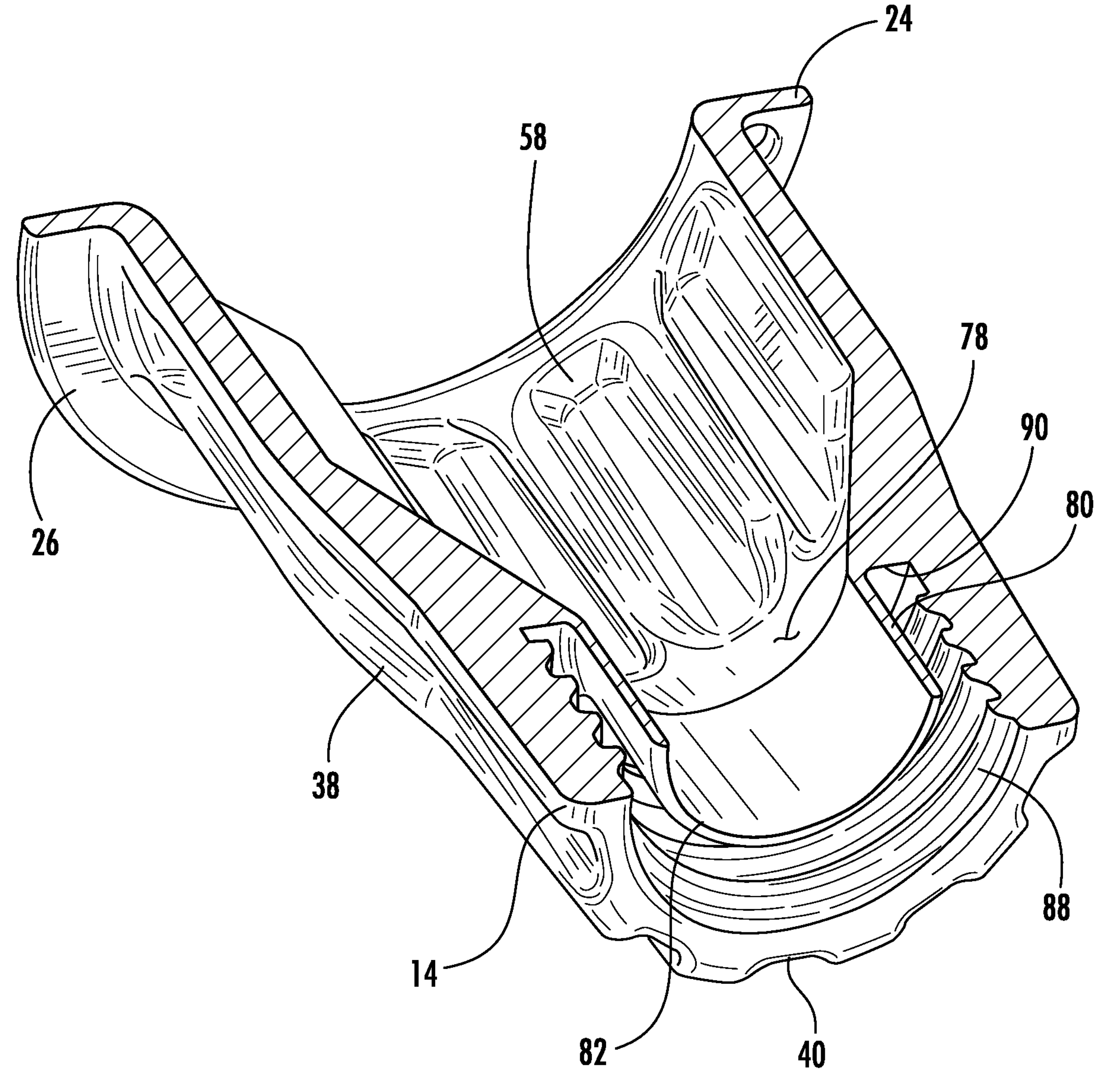
FIG. 7B is an alternative cross-sectional view of the drain funnel adapter.

Each of the engaging members 50 extend from the first end 12 towards the second end 14, terminating in an inner surface 78, see FIG. 7A or 7B. The inner surface 78 may be angled or slanted to allow fluid to flow into a lower stem 80. The stem 80 is shown having a generally tubular shaped body 82 having a diameter that is smaller than the diameter, $D_1$, of the upper end or portion 20 or the diameter, $D_2$, of the lower end or portion 22. The stem 80 terminates in an opening 83 (thus forming an inner opening), see FIG. 2. Separated from the stem 80 via a space or gap 84 is a second end locking unit 86 (may also be referred to as a second locking or engagement member) constructed and arranged to engage with and secure to the fluid container 44. As shown in FIGS. 7A and 7B, the second end locking unit 86 is illustrated with threading 88 sized and shaped to correspond with threading 89 (see FIG. 8B) on the fluid container 44. The second end opening 34 is sized and shaped to receive a portion of the fluid container 44. When inserted therein, the fluid container 44 is prevented from screwing too far into the second end locking unit 86 via a stop surface 90.

Figure 8A:
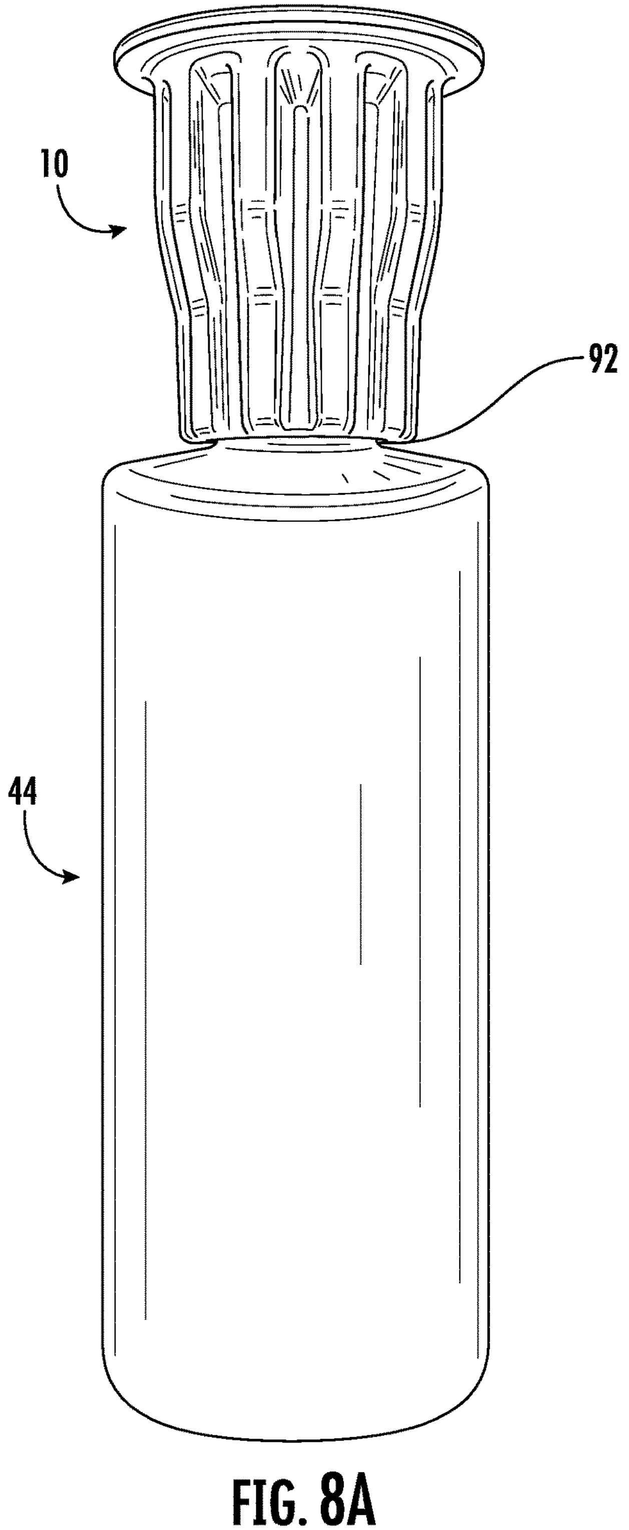
FIG. 8A illustrates the drain funnel adapter secured to a container, illustrated as a small bottle.
Figure 8B:
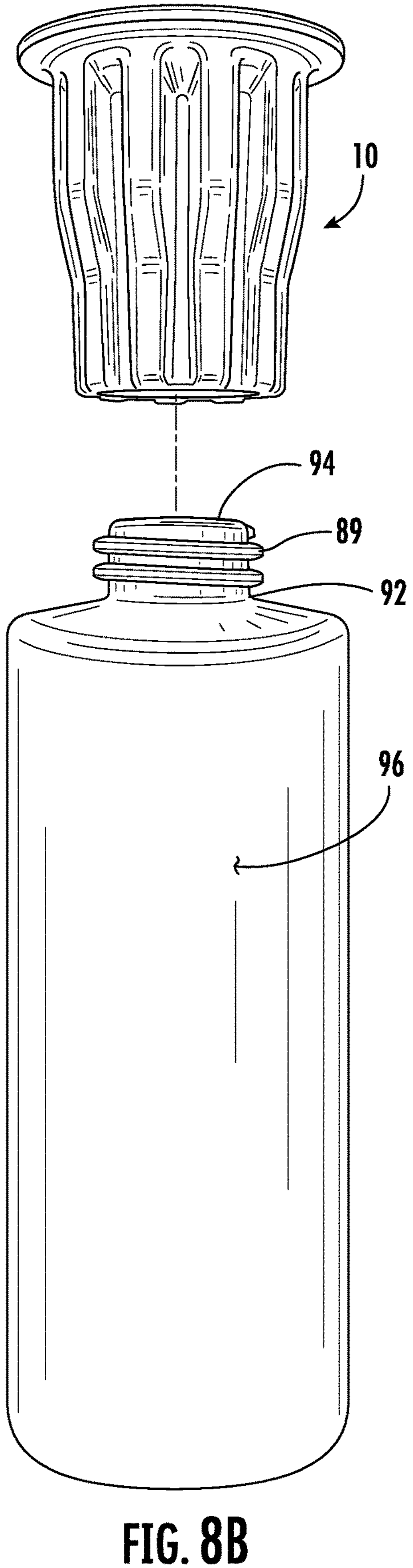
FIG. 8B illustrates the drain funnel adapter removed from the container.
Figure 9A:
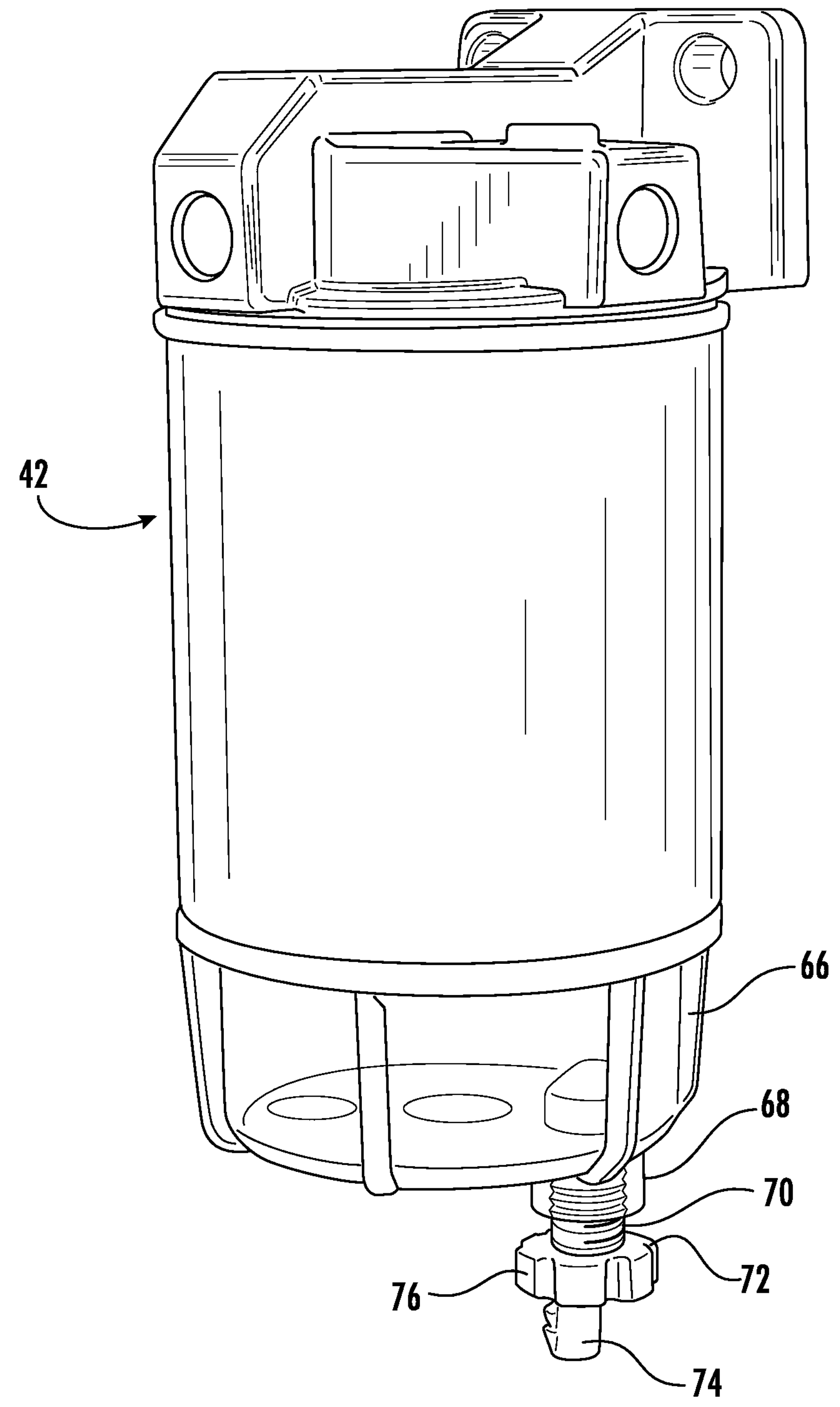
FIG. 9A illustrates a commercial embodiment of a fuel filter water separator, shown with a water collection bowl.
Figure 9B:
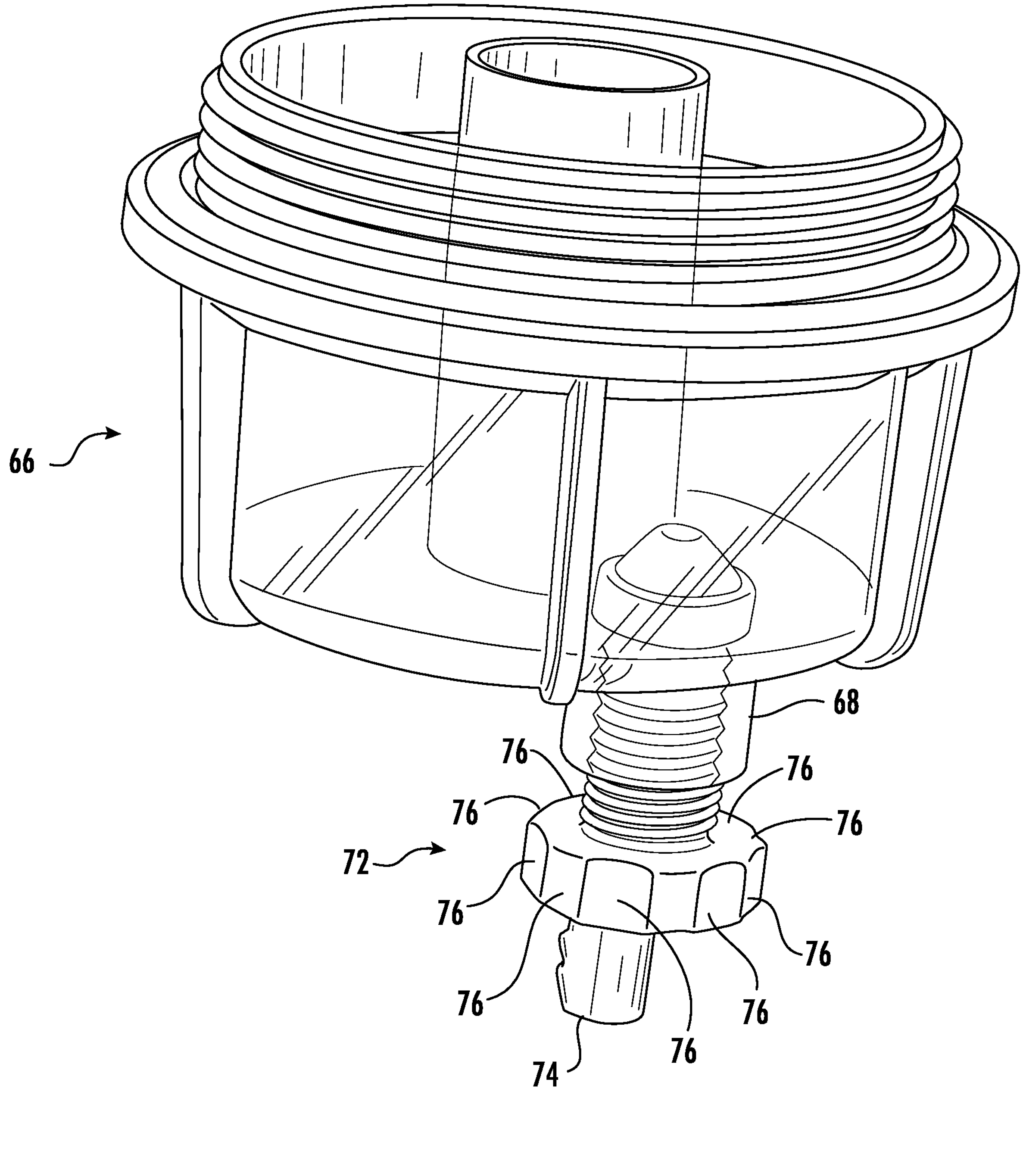
FIG. 9B illustrates the water collection bowl removed from the fuel filter water separator.

In use, the drain funnel adapter 10 may first be secured to the fluid container 44, see FIG. 8A. The fluid container 44 illustrated in FIGS. 8A and 8B is a 16 oz. plastic bottle. The fluid container 44, however, may be sized to receive and hold a smaller volume of fluid or a larger volume of fluid, such as 64 ounces, 96 ounces, one gallon, three gallons, or more than three gallons. In addition, the fluid container 44 may be made of other materials, such as other synthetic resin materials or glass. Threading 89 on a neck 92 of the fluid container 44 is inserted into the second end opening 34 of the drain funnel adapter 10. The threaded neck 92 mates with the threading 88, securing the fluid container 44 at the second end 14 of the drain funnel adapter 10, with the stem 80 inserted into a fluid container opening. In this manner, fluid may be directed into the interior chamber of the fluid container 44, thus preventing dripping along the outer surface 96. The drain may then engage and be secured to the fuel filter water separator 42. Inserting the first end 12 of the drain funnel adapter 10 so the plurality of engaging members 50 first end locking unit 48 contacts and engages with the self-venting water drain 70 of the fuel filter water separator collection bowl 66.

Each of the self-venting water drain screw head side walls or surfaces 76 align with two engaging members 50, with each side wall or surface 76 resting on or at, and sealing against, the front walls or surfaces 64 of two adjacent engaging members 50. In this engagement, the hose attachment 74 (and thus any fluid exiting therefrom) is directed towards or within the stem 80. Any fluid that may escape from the sides of the drainage port 68, i.e. out from the sides, not through the hose attachment 74, will be directed to and flow through the fluid flow channels 56. Directing any excess fluid to flow through the fluid flow channels 56 prevents, or minimizes, fluid build-up/blockage within the drain funnel adapter 10 and fluid flow along the outside of the drain funnel adapter 10 (and correspondingly, along the outside of the fluid container 44).

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A drain funnel adapter for use in transferring fluids, comprising:

a body constructed and arranged to facilitate movement of a fluid, said body comprising an inner passageway constructed and arranged to allow movement of said fluid from a first end of said drain funnel adapter to a second end, said inner passageway having a terminal stem segment having a diameter of sufficient size to fit within an opening of a second threaded container;

a first locking component comprising a plurality of internally positioned engagement members constructed and arranged to secure to a first container;

a second locking component constructed and arranged to secure to said second threaded container, said second locking component comprising threading located on an internal surface of said body and sized and shaped to engage with and secure to corresponding threading associated with said second threaded container, said internally threaded surface arranged at a distance from said terminal stem segment, thus forming a space therebetween, said space being of sufficient size to allow for a portion of said threaded second container to rest therebetween, wherein when said second locking component and said threaded second container are threaded together, said drain funnel adapter secures to said threaded second container with said stem portion inserted into said threaded second container opening.

2. The drain funnel adapter according to claim 1, wherein said body comprises a tapering defining an upper portion and a lower portion, said upper portion having a larger cross sectional diameter than a cross sectional diameter of said lower end portion.

3. The drain funnel adapter according to claim 1, further comprising a flanged wall forming a perimeter at said first end.

4. The drain funnel adapter according to claim 1, wherein said plurality of engaging engagement members are elongated bodies extending out from an interior surface, towards a middle of said body.

5. The drain funnel adapter according to claim 4, wherein said elongated bodies are arranged around an inner perimeter.

6. The drain funnel adapter according to claim 4, wherein each said elongated body is separated from an adjacent engaging member by fluid flow channels.

7. The drain funnel adapter according to claim 1, further including a stop member for preventing said second container from insertion into an interior portion past said stop member.

8. A drain funnel adapter for transferring a fluid, comprising:

a body comprising a first end, a second end, and an inner passageway constructed and arranged to allow movement of said fluid, said inner passageway having an end portion constructed and arranged to direct fluid into a threaded container, said inner passageway end portion having a diameter of sufficient size to fit within an opening of said threaded container;

said first end comprising a first locking component comprising a plurality of internally positioned engagement members sized, shaped and arranged to engage with and secure to an outer surface of a fuel filter water separator collection bowl drain screw;

said second comprising a second locking component constructed and arranged to secure to said threaded container, said second locking component comprising threading located on along an internal surface of said body and sized and shaped to engage with and secure to corresponding threading associated with said second threaded container, said internally threaded surface arranged at a distance from said inner passageway end portion, thus forming a space therebetween, said space being of sufficient size to allow for a portion of said threaded container to rest therebetween, wherein when said second locking component and said threaded container are threaded together, said drain funnel adapter secures to said threaded second container with said stem portion inserted into said threaded second container opening.

9. The drain funnel adapter according to claim 8, wherein said body is defined by a tapered end.

10. The drain funnel adapter according to claim 8, further including a flanged wall extending from said body about a perimeter.

11. The drain funnel adapter according to claim 8, wherein said body includes one or more outer surface protrusions.

12. The drain funnel adapter according to claim 8, further including a stop member.

13. The drain funnel adapter according to claim 8, wherein said plurality of engagement members are elongated bodies extending out from an interior surface, towards a middle of said body.

14. The drain funnel adapter according to claim 13, wherein each said elongated body is separated from an adjacent engaging member by fluid flow channels.

* * * * *